(12) United States Patent
Rimer et al.

(10) Patent No.: US 12,039,017 B2
(45) Date of Patent: Jul. 16, 2024

(54) USER ENTITY NORMALIZATION AND ASSOCIATION

(71) Applicant: PALO ALTO NETWORKS (ISRAEL ANALYTICS) LTD., Tel Aviv (IL)

(72) Inventors: Netanel Rimer, Rehovot (IL); Aviad Meyer, Hod-Hasharon (IL); Yaron Neuman, Zoran (IL); Jonathan Allon, Haifa (IL)

(73) Assignee: PALO ALTO NETWORKS (ISRAEL ANALYTICS) LTD., Tel Aviv (IL)

( * ) Notice: Subject to any disclaimer, the term of this patent is extended or adjusted under 35 U.S.C. 154(b) by 208 days.

(21) Appl. No.: 17/505,673

(22) Filed: Oct. 20, 2021

(65) Prior Publication Data

US 2023/0117268 A1    Apr. 20, 2023

(51) Int. Cl.
*G06F 21/31*    (2013.01)
*G06F 21/55*    (2013.01)

(52) U.S. Cl.
CPC ............ *G06F 21/31* (2013.01); *G06F 21/554* (2013.01); *G06F 2221/034* (2013.01)

(58) Field of Classification Search
CPC .................. G06F 21/31; G06F 21/554; G06F 2221/034; G06F 21/552; H04L 63/1425
See application file for complete search history.

(56) References Cited

U.S. PATENT DOCUMENTS

| | | |
|---|---|---|
| 5,991,881 A | 11/1999 | Conklin et al. |
| 6,347,374 B1 | 2/2002 | Drake et al. |
| 6,704,874 B1 | 3/2004 | Porras et al. |
| 7,003,790 B1 | 2/2006 | Inoue et al. |
| 7,007,301 B2 | 2/2006 | Crosbie et al. |
| 7,178,164 B1 | 2/2007 | Bonnes |
| 7,181,769 B1 | 2/2007 | Keanini et al. |
| 7,523,016 B1 | 4/2009 | Surdulescu et al. |
| 7,684,568 B2 | 3/2010 | Yonge, III et al. |
| 7,694,150 B1 | 4/2010 | Kirby |
| 7,703,138 B2 | 4/2010 | Desai et al. |
| 7,712,134 B1 | 5/2010 | Nucci et al. |
| 7,752,665 B1 | 7/2010 | Robertson et al. |

(Continued)

FOREIGN PATENT DOCUMENTS

| | | | | |
|---|---|---|---|---|
| CA | 3041875 A1 | * | 11/2019 | ......... G06F 16/9024 |
| CN | 103561048 A | | 2/2014 | |

(Continued)

OTHER PUBLICATIONS

U.S. Appl. No. 17/571,558 Office Action dated Jun. 26, 2023.

(Continued)

*Primary Examiner* — Christopher A Revak
(74) *Attorney, Agent, or Firm* — KLIGLER & ASSOCIATES PATENT ATTORNEYS LTD.

(57) ABSTRACT

Methods, apparatuses and computer program products implement embodiments of the present invention that include protecting a computer system by identifying multiple user identifiers associated with a single user entity. A first event carried out using a first one of the user identifiers is detected. Upon detecting a second event carried out using a second one of the user identifiers that is different from the first one of the user identifiers, an alert can be issued in response to a combination of the first and the second events.

21 Claims, 5 Drawing Sheets

(56) References Cited

U.S. PATENT DOCUMENTS

| | | |
|---|---|---|
| 7,908,655 B1 | 3/2011 | Bhattacharyya et al. |
| 8,245,298 B2 | 8/2012 | Pletka et al. |
| 8,397,284 B2 | 3/2013 | Kommareddy et al. |
| 8,429,180 B1 | 4/2013 | Sobel et al. |
| 8,490,190 B1 | 7/2013 | Hernacki et al. |
| 8,516,573 B1 | 8/2013 | Brown et al. |
| 8,555,388 B1 | 10/2013 | Wang et al. |
| 8,578,345 B1 | 11/2013 | Kennedy et al. |
| 8,607,353 B2 | 12/2013 | Rippert, Jr. et al. |
| 8,620,942 B1 | 12/2013 | Hoffman et al. |
| 8,677,487 B2 | 3/2014 | Balupari et al. |
| 8,762,288 B2 | 6/2014 | Dill |
| 8,769,681 B1 | 7/2014 | Michels et al. |
| 8,925,095 B2 | 12/2014 | Herz et al. |
| 8,966,625 B1 | 2/2015 | Zuk et al. |
| 9,038,178 B1 | 5/2015 | Lin |
| 9,118,582 B1 | 8/2015 | Martini |
| 9,147,071 B2 | 9/2015 | Sallam |
| 9,231,962 B1 | 1/2016 | Yen et al. |
| 9,319,421 B2 | 4/2016 | Ferragut et al. |
| 9,342,691 B2 | 5/2016 | Maestas |
| 9,378,361 B1 | 6/2016 | Yen et al. |
| 9,386,028 B2 | 7/2016 | Altman |
| 9,531,614 B1 | 12/2016 | Nataraj et al. |
| 9,531,736 B1 | 12/2016 | Torres et al. |
| 9,690,933 B1 | 6/2017 | Singh et al. |
| 9,736,251 B1 | 8/2017 | Samant et al. |
| 9,773,112 B1 | 9/2017 | Rathor et al. |
| 9,979,739 B2 | 5/2018 | Mumcuoglu et al. |
| 9,979,742 B2 | 5/2018 | Mumcuoglu et al. |
| 10,027,694 B1 | 7/2018 | Gupta et al. |
| 10,075,461 B2 | 9/2018 | Mumcuoglu et al. |
| 10,140,453 B1 | 11/2018 | Fridakis |
| 10,181,032 B1* | 1/2019 | Sadaghiani ............. G06N 3/08 |
| 10,237,875 B1 | 3/2019 | Romanov |
| 10,360,367 B1* | 7/2019 | Mossoba ............. G06F 3/0658 |
| 10,706,144 B1 | 7/2020 | Moritz et al. |
| 10,728,281 B2 | 7/2020 | Kurakami |
| 10,904,277 B1 | 1/2021 | Sharifi Mehr |
| 11,100,199 B2* | 8/2021 | Subramaniam ....... H04L 63/102 |
| 11,501,261 B1* | 11/2022 | Schemers ............. H04L 51/08 |
| 2002/0059078 A1 | 5/2002 | Valdes et al. |
| 2002/0133586 A1 | 9/2002 | Shanklin et al. |
| 2003/0110396 A1 | 6/2003 | Lewis et al. |
| 2003/0133443 A1 | 7/2003 | Klinker et al. |
| 2004/0003286 A1 | 1/2004 | Kaler et al. |
| 2004/0015728 A1 | 1/2004 | Cole et al. |
| 2004/0117658 A1 | 6/2004 | Klaes |
| 2004/0199793 A1 | 10/2004 | Wilken et al. |
| 2004/0210769 A1 | 10/2004 | Radatti et al. |
| 2004/0250169 A1 | 12/2004 | Takemori et al. |
| 2004/0260733 A1 | 12/2004 | Adelstein et al. |
| 2005/0015624 A1 | 1/2005 | Ginter et al. |
| 2005/0060295 A1 | 3/2005 | Gould et al. |
| 2005/0069130 A1 | 3/2005 | Kobayashi |
| 2005/0071330 A1 | 3/2005 | Douceur et al. |
| 2005/0123138 A1 | 6/2005 | Abe et al. |
| 2005/0128989 A1 | 6/2005 | Bhagwat et al. |
| 2005/0183120 A1 | 8/2005 | Jain et al. |
| 2005/0216749 A1 | 9/2005 | Brent |
| 2005/0262556 A1 | 11/2005 | Waisman et al. |
| 2005/0262560 A1 | 11/2005 | Gassoway |
| 2005/0268112 A1 | 12/2005 | Wang et al. |
| 2005/0286423 A1 | 12/2005 | Poletto et al. |
| 2006/0018466 A1 | 1/2006 | Adelstein et al. |
| 2006/0075462 A1 | 4/2006 | Golan |
| 2006/0075492 A1 | 4/2006 | Golan et al. |
| 2006/0075500 A1 | 4/2006 | Bertman et al. |
| 2006/0107321 A1 | 5/2006 | Tzadikario |
| 2006/0126522 A1 | 6/2006 | Oh |
| 2006/0136720 A1 | 6/2006 | Armstrong et al. |
| 2006/0137009 A1 | 6/2006 | Chesla |
| 2006/0149848 A1 | 7/2006 | Shay |
| 2006/0156398 A1 | 7/2006 | Ross et al. |
| 2006/0161984 A1 | 7/2006 | Phillips et al. |
| 2006/0190803 A1 | 8/2006 | Kawasaki et al. |
| 2006/0191010 A1 | 8/2006 | Benjamin |
| 2006/0215627 A1 | 9/2006 | Waxman |
| 2006/0242694 A1 | 10/2006 | Gold et al. |
| 2006/0259967 A1 | 11/2006 | Thomas et al. |
| 2006/0282893 A1 | 12/2006 | Wu et al. |
| 2007/0011319 A1 | 1/2007 | McClure et al. |
| 2007/0072661 A1 | 3/2007 | Lototski |
| 2007/0073519 A1 | 3/2007 | Long |
| 2007/0116277 A1 | 5/2007 | Ro et al. |
| 2007/0124474 A1 | 5/2007 | Margulis |
| 2007/0198603 A1 | 8/2007 | Tsioutsiouliklis et al. |
| 2007/0201691 A1 | 8/2007 | Kumagaya |
| 2007/0201693 A1 | 8/2007 | Ohno |
| 2007/0218874 A1 | 9/2007 | Sinha et al. |
| 2007/0226796 A1 | 9/2007 | Gilbert et al. |
| 2007/0226802 A1 | 9/2007 | Gopalan et al. |
| 2007/0245420 A1 | 10/2007 | Yong et al. |
| 2007/0255724 A1 | 11/2007 | Jung et al. |
| 2007/0283166 A1 | 12/2007 | Yami et al. |
| 2008/0005782 A1 | 1/2008 | Aziz |
| 2008/0013725 A1 | 1/2008 | Kobayashi |
| 2008/0016339 A1 | 1/2008 | Shukla |
| 2008/0016570 A1 | 1/2008 | Capalik |
| 2008/0104046 A1 | 5/2008 | Singla et al. |
| 2008/0104703 A1 | 5/2008 | Rihn et al. |
| 2008/0134296 A1 | 6/2008 | Amitai et al. |
| 2008/0148381 A1 | 6/2008 | Aaron |
| 2008/0198005 A1 | 8/2008 | Schulak et al. |
| 2008/0244097 A1 | 10/2008 | Candelore et al. |
| 2008/0262991 A1 | 10/2008 | Kapoor et al. |
| 2008/0271143 A1 | 10/2008 | Stephens et al. |
| 2008/0285464 A1 | 11/2008 | Katzir |
| 2008/0301567 A1* | 12/2008 | Martin ............. H04M 1/72412 715/751 |
| 2009/0007100 A1 | 1/2009 | Field et al. |
| 2009/0007220 A1 | 1/2009 | Ormazabal et al. |
| 2009/0115570 A1 | 5/2009 | Cusack, Jr. |
| 2009/0157574 A1 | 6/2009 | Lee |
| 2009/0164522 A1 | 6/2009 | Fahey |
| 2009/0193103 A1 | 7/2009 | Small et al. |
| 2009/0265777 A1 | 10/2009 | Scott |
| 2009/0320136 A1 | 12/2009 | Ambert et al. |
| 2010/0014594 A1 | 1/2010 | Beheydt et al. |
| 2010/0054241 A1 | 3/2010 | Shah et al. |
| 2010/0071063 A1 | 3/2010 | Wang et al. |
| 2010/0107257 A1 | 4/2010 | Ollmann |
| 2010/0146292 A1 | 6/2010 | Shi et al. |
| 2010/0146293 A1 | 6/2010 | Shi et al. |
| 2010/0146501 A1 | 6/2010 | Wyatt et al. |
| 2010/0162400 A1 | 6/2010 | Feeney et al. |
| 2010/0197318 A1 | 8/2010 | Petersen et al. |
| 2010/0212013 A1 | 8/2010 | Kim et al. |
| 2010/0217861 A1 | 8/2010 | Wu |
| 2010/0235915 A1 | 9/2010 | Memon et al. |
| 2010/0268818 A1 | 10/2010 | Richmond et al. |
| 2010/0272257 A1 | 10/2010 | Beals |
| 2010/0278054 A1 | 11/2010 | Dighe |
| 2010/0280978 A1 | 11/2010 | Shimada et al. |
| 2010/0284282 A1 | 11/2010 | Golic |
| 2010/0299430 A1 | 11/2010 | Powers et al. |
| 2011/0026521 A1 | 2/2011 | Gamage et al. |
| 2011/0035795 A1 | 2/2011 | Shi |
| 2011/0087779 A1 | 4/2011 | Martin et al. |
| 2011/0125770 A1 | 5/2011 | Battestini et al. |
| 2011/0135090 A1 | 6/2011 | Chan et al. |
| 2011/0138463 A1 | 6/2011 | Kim et al. |
| 2011/0153748 A1 | 6/2011 | Lee et al. |
| 2011/0185055 A1 | 7/2011 | Nappier et al. |
| 2011/0185421 A1 | 7/2011 | Wittenstein et al. |
| 2011/0214187 A1 | 9/2011 | Wittenstein et al. |
| 2011/0247071 A1 | 10/2011 | Hooks et al. |
| 2011/0265011 A1 | 10/2011 | Taylor et al. |
| 2011/0270957 A1 | 11/2011 | Phan et al. |
| 2011/0271343 A1 | 11/2011 | Kim et al. |
| 2011/0302653 A1 | 12/2011 | Frantz et al. |
| 2011/0317770 A1 | 12/2011 | Lehtiniemi et al. |
| 2012/0042060 A1 | 2/2012 | Jackowski et al. |
| 2012/0079596 A1 | 3/2012 | Thomas et al. |

(56) References Cited

U.S. PATENT DOCUMENTS

| | | |
|---|---|---|
| 2012/0102359 A1 | 4/2012 | Hooks |
| 2012/0136802 A1 | 5/2012 | Mcquade et al. |
| 2012/0137342 A1 | 5/2012 | Hartrell et al. |
| 2012/0143650 A1 | 6/2012 | Crowley et al. |
| 2012/0191660 A1 | 7/2012 | Hoog |
| 2012/0222120 A1 | 8/2012 | Rim et al. |
| 2012/0233311 A1 | 9/2012 | Parker et al. |
| 2012/0240185 A1 | 9/2012 | Kapoor et al. |
| 2012/0275505 A1 | 11/2012 | Tzannes et al. |
| 2012/0308008 A1 | 12/2012 | Kondareddy et al. |
| 2012/0331553 A1 | 12/2012 | Aziz et al. |
| 2013/0031600 A1 | 1/2013 | Luna et al. |
| 2013/0061045 A1 | 3/2013 | Kiefer et al. |
| 2013/0083700 A1 | 4/2013 | Sndhu et al. |
| 2013/0097706 A1 | 4/2013 | Titonis et al. |
| 2013/0111211 A1 | 5/2013 | Winslow et al. |
| 2013/0031037 A1 | 7/2013 | Brandt et al. |
| 2013/0196549 A1 | 8/2013 | Sorani |
| 2013/0298237 A1 | 11/2013 | Smith |
| 2013/0298243 A1 | 11/2013 | Kumar et al. |
| 2013/0333041 A1 | 12/2013 | Christodorescu et al. |
| 2014/0010367 A1 | 1/2014 | Wang |
| 2014/0013434 A1 | 1/2014 | Ranum et al. |
| 2014/0165207 A1 | 6/2014 | Engel et al. |
| 2014/0198669 A1 | 7/2014 | Brown et al. |
| 2014/0201776 A1 | 7/2014 | Minemura et al. |
| 2014/0230059 A1 | 8/2014 | Wang |
| 2014/0325643 A1 | 10/2014 | Bart et al. |
| 2015/0026810 A1 | 1/2015 | Friedrichs et al. |
| 2015/0040219 A1 | 2/2015 | Garraway et al. |
| 2015/0047032 A1 | 2/2015 | Hannis et al. |
| 2015/0071308 A1 | 3/2015 | Webb, III et al. |
| 2015/0121461 A1 | 4/2015 | Dulkin et al. |
| 2015/0156270 A1 | 6/2015 | Teraoka et al. |
| 2015/0180883 A1 | 6/2015 | Aktas et al. |
| 2015/0195300 A1 | 7/2015 | Adjaoute |
| 2015/0207694 A1 | 7/2015 | Inches et al. |
| 2015/0264069 A1 | 9/2015 | Beauchesne et al. |
| 2015/0295903 A1 | 10/2015 | Yi et al. |
| 2015/0304346 A1 | 10/2015 | Kim |
| 2015/0341380 A1 | 11/2015 | Heo et al. |
| 2015/0341389 A1 | 11/2015 | Kurakami |
| 2015/0356451 A1 | 12/2015 | Gupta et al. |
| 2016/0021141 A1 | 1/2016 | Liu et al. |
| 2016/0119292 A1 | 4/2016 | Kaseda et al. |
| 2016/0127390 A1 | 5/2016 | Lai et al. |
| 2016/0142746 A1 | 5/2016 | Schuberth |
| 2016/0191918 A1 | 6/2016 | Lai et al. |
| 2016/0234167 A1 | 8/2016 | Engel et al. |
| 2016/0247163 A1 | 8/2016 | Donsky et al. |
| 2016/0315954 A1 | 10/2016 | Peterson et al. |
| 2016/0323299 A1 | 11/2016 | Huston, III |
| 2016/0359895 A1 | 12/2016 | Chiu et al. |
| 2017/0007128 A1* | 1/2017 | Takano ............... A61B 5/0022 |
| 2017/0026387 A1 | 1/2017 | Vissamsetty et al. |
| 2017/0026395 A1 | 1/2017 | Mumcuoglu et al. |
| 2017/0054744 A1 | 2/2017 | Mumcuoglu et al. |
| 2017/0063921 A1 | 3/2017 | Fridman et al. |
| 2017/0078312 A1 | 3/2017 | Yamada et al. |
| 2017/0111376 A1 | 4/2017 | Friedlander et al. |
| 2017/0171229 A1 | 6/2017 | Arzi et al. |
| 2017/0262633 A1 | 9/2017 | Miserendino et al. |
| 2017/0289178 A1 | 10/2017 | Roundy et al. |
| 2017/0294112 A1 | 10/2017 | Kushnir |
| 2017/0374090 A1 | 12/2017 | McGrew et al. |
| 2018/0004948 A1 | 1/2018 | Martin et al. |
| 2018/0007013 A1 | 1/2018 | Wang |
| 2018/0048662 A1 | 2/2018 | Jang et al. |
| 2018/0077189 A1 | 3/2018 | Doppke et al. |
| 2018/0288081 A1 | 10/2018 | Yermakov |
| 2018/0332064 A1 | 11/2018 | Harris et al. |
| 2018/0365416 A1 | 12/2018 | Monastyrsky et al. |
| 2018/0373820 A1 | 12/2018 | Knezevic et al. |
| 2019/0036978 A1 | 1/2019 | Shulman-Peleg et al. |
| 2019/0044963 A1 | 2/2019 | Rajasekharan et al. |
| 2019/0044965 A1* | 2/2019 | Pilkington ............ H04L 63/1416 |
| 2019/0068620 A1 | 2/2019 | Avrahami et al. |
| 2019/0075344 A1* | 3/2019 | Brown ............. H04N 21/44224 |
| 2019/0207966 A1 | 7/2019 | Vashisht et al. |
| 2019/0297097 A1 | 9/2019 | Gong et al. |
| 2019/0319981 A1 | 10/2019 | Meshi et al. |
| 2019/0334931 A1 | 10/2019 | Arlitt et al. |
| 2020/0007566 A1 | 1/2020 | Wu |
| 2020/0082296 A1 | 3/2020 | Fly et al. |
| 2020/0136889 A1* | 4/2020 | Chen ....................... H04L 41/22 |
| 2020/0145435 A1 | 5/2020 | Chiu et al. |
| 2020/0162252 A1* | 5/2020 | Davis ................... G06F 21/105 |
| 2020/0162494 A1 | 5/2020 | Rostami-Hesarsorkh |
| 2020/0195673 A1 | 6/2020 | Lee |
| 2020/0244658 A1 | 7/2020 | Meshi et al. |
| 2020/0244675 A1 | 7/2020 | Meshi et al. |
| 2020/0244676 A1 | 7/2020 | Amit et al. |
| 2020/0244683 A1 | 7/2020 | Meshi et al. |
| 2020/0244684 A1 | 7/2020 | Meshi et al. |
| 2020/0274894 A1 | 8/2020 | Argoeti et al. |
| 2020/0285737 A1 | 9/2020 | Kraus et al. |
| 2020/0293917 A1 | 9/2020 | Wang et al. |
| 2020/0327221 A1 | 10/2020 | Street |
| 2020/0327225 A1 | 10/2020 | Nguyen et al. |
| 2020/0342230 A1* | 10/2020 | Tsai ......................... G06V 20/20 |
| 2020/0374301 A1 | 11/2020 | Manevich et al. |
| 2021/0004458 A1 | 1/2021 | Edwards et al. |
| 2021/0176261 A1 | 6/2021 | Yavo et al. |
| 2021/0182387 A1 | 6/2021 | Zhu et al. |
| 2021/0209228 A1* | 7/2021 | Maor ..................... G06F 21/552 |
| 2021/0224676 A1 | 7/2021 | Arzani et al. |
| 2022/0129551 A1 | 4/2022 | Collier et al. |
| 2022/0138856 A1* | 5/2022 | Ahlstrom ............ G06F 16/245 |
| | | 705/36 R |
| 2022/0217156 A1 | 7/2022 | Wahbo |
| 2023/0171235 A1 | 6/2023 | Chhibber et al. |

FOREIGN PATENT DOCUMENTS

| | | |
|---|---|---|
| EP | 0952521 A2 | 10/1999 |
| EP | 2056559 A1 | 5/2009 |
| WO | 03083660 A1 | 10/2003 |

OTHER PUBLICATIONS

Palo Alto Networks, Inc., "CORTEX XSOAR—Redefining Security Orchestration and Automation," product Information, pp. 1-2, year 2020.

Light Cyber Ltd, "LightCyber Magna", pp. 1-3, year 2011.

TIER-3 Pty Ltd, "Huntsman Protector 360", Brochure, pp. 1-2, Apr. 1, 2010.

TIER-3 Pty Ltd, "Huntsman 5.7 The Power of 2", Brochure, pp. 1-2, Oct. 8, 2012.

Bilge et at., "Disclosure: Detecting Botnet Command and Control Servers Through Large-Scale NetFlow Analysis", ACSAC, pp. 1-10, Dec. 3-7, 2012.

Blum., "Combining Labeled and Unlabeled Data with Co-Training", Carnegie Mellon University, Research Showcase @ CMU, Computer Science Department, pp. 1-11, Jul. 1998.

Felegyhazi et al., "On the Potential of Proactive Domain Blacklisting", LEET'10 Proceedings of the 3rd USENIX Conference on Large-scale exploits and emergent threats, pp. 1-8, San Jose, USA, Apr. 27, 2010.

Frosch., "Mining DNS-related Data for Suspicious Features", Ruhr Universitat Bochum, Master'sThesis, pp. 1-88, Dec. 23, 2011.

Bilge at al., "Exposure: Finding Malicious Domains Using Passive DNS Analysis ", NDSS Symposium, pp. 1-17, Feb. 6-9, 2011.

Gross et al., "Fire: Finding Rogue Networks", Annual Conference on Computer Security Applications (ACSAC'09), pp. 1-10, Dec. 7-11, 2009.

Markowitz, N., "Bullet Proof Hosting: A Theoretical Model", Security Week, [pp. 1-5, Jun. 29, 2010, downloaded from http://www.infosecisland.com/blogview/4487-Bullet-Proof-Hosting-A-Theoretical-Model.html.

(56) References Cited

OTHER PUBLICATIONS

Konte et al., "ASwatch: An AS Reputation System to Expose Bulletproof Hosting ASes", SIGCOMM , pp. 625-638, Aug. 17-21, 2015.
Markowitz, N., "Patterns of Use and Abuse with IP Addresses", Security Week, pp. 1-4, Jul. 10, 2010, downloaded from http://infosecisland.com/blogview/5068-Patterns-of-Use-and-Abuse-with-IP-Addresses.html.
Wei et al., "Identifying New Spam Domains by Hosting IPs: Improving Domain Blacklisting", Department of Computer and Information Sciences, University of Alabama at Birmingham, USA, pp. 1-8, Dec. 8, 2010.
Goncharov, M., "Criminal Hideouts for Lease: Bulletproof Hosting Services", Forward-Looking Threat Research (FTR) Team, A TrendLabsSM Research Paper, pp. 1-28, Jul. 3, 2015.
Xu, "Correlation Analysis of Intrusion Alerts," Dissertation in Computer Science submitted to the Graduate Faculty, North Carolina State University, pp. 1-206, year 2006.
U.S. Appl. No. 17/038,285 Office Action dated Mar. 21, 2022.
International Application # PCT/IB2022/059544 Search Report dated Jan. 20, 2023.
International Application # PCT/IB2022/060920 Search Report dated Feb. 7, 2023.
EP Application # 19832439.4 Office Action dated Mar. 1, 2023.
U.S. Appl. No. 17/175,720 Office Action dated Mar. 20, 2023.
International Application # PCT/IB2022/061926 Search Report dated Mar. 27, 2023.
U.S. Appl. No. 17/700,579 Office Action dated Mar. 23, 2023.
U.S. Appl. No. 17/464,716 Office Action dated Apr. 14, 2023.
U.S. Appl. No. 17/464,709 Office Action dated Apr. 14, 2023.
U.S. Appl. No. 17/175,720 Office Action dated Nov. 7, 2022.
U.S. Appl. No. 17/506,713 Office Action dated Nov. 8, 2022.
Brownlee et al., "Traffic Flow Measurement: Architecture," Request for Comments 2722, Network Working Group, pp. 1-48, Oct. 1999.
"PA-3250 Next Generation Firewall," PS-3200 Series, Datasheet, Palo Alto Networks, Inc., Santa Clara, CA, USA, pp. 1-4, year 2021.
"What is PCI DSS?" Palo Alto Networks, Cyberpedia, pp. 1-5, year 2021, as downloaded from https://www.paloaltonetworks.com/cyberpedia/what-is-a-pci-dss.
Wikipedia, "Active Directory," pp. 1-14, last edited Oct. 2021.
International Application # PCT/IB2021/058621 Search Report dated Dec. 14, 2021.
Steimberg et al., U.S. Appl. No. 17/038,285, filed Sep. 30, 2020.
Niksun, "Network Intrusion Forensic System (NIFS) for Intrusion Detection and Advanced Post Incident Forensics", Whitepaper, pp. 1-12, Feb. 15, 2010.
Shulman, A., "Top Ten Database Security Threats How to Mitigate the Most Significant Database Vulnerabilities", White Paper, pp. 1-14, year 2006.
Asrigo et al., "Using VMM-based sensors to monitor honeypots," Proceedings of the 2nd International Conference on Virtual Execution Environments, pp. 13-23, Jun. 14, 2006.
Bhuyan et al., "Surveying Port Scans and Their Detection Methodologies", Computer Journal, vol. 54, No. 10. pp. 1565-1581, Apr. 20, 2011.
Skormin, "Anomaly-Based Intrusion Detection Systems Utilizing System Call Data", Watson School of Engineering at Binghamton University, pp. 1-82, Mar. 1, 2012.
Palo Alto Networks, "Cortex XDR", datasheet, pp. 1-7, year 2020.
Palo Alto Networks, "WildFire", datasheet, pp. 1-6, year 2020.
Barford et al., "Characteristics of Network Traffic Flow Anomalies," Proceedings of the 1st ACM SIGCOMM Workshop on Internet Measurement, pp. 69-73, year 2001.
U.S. Appl. No. 17/700,579 Office Action dated Oct. 13, 2023.
AU Application # 2021351215 Office Action dated Nov. 28, 2023.
U.S. Appl. No. 17/676,275 Office Action dated Feb. 29, 2024.

* cited by examiner

USER ENTITY NORMALIZATION AND ASSOCIATION

FIELD OF THE INVENTION

The present invention relates generally to computer security and networks, and particularly to associating user identifiers in event logs with a user entity and generating a user entity profile based on events in the logs.

BACKGROUND OF THE INVENTION

In many computers and network systems, multiple layers of security apparatus and software are deployed in order to detect and repel the ever-growing range of security threats. At the most basic level, computers use anti-virus software to prevent malicious software from running on the computer. At the network level, intrusion detection and prevention systems analyze and control network traffic to detect and prevent malware from spreading through the network.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method for protecting a computer system, including identifying, by a processor, multiple user identifiers associated with a single user entity, detecting a first event carried out using a first one of the user identifiers, detecting a second event carried out using a second one of the user identifiers that is different from the first one of the user identifiers, and in response to a combination of the first and the second events, issuing an alert.

In some embodiments, identifying the multiple user identifiers associated with the single user entity includes collecting a set of events including the first and the second events, extracting respective user identifiers from the events in the set, mapping the extracted user identifiers to respective accounts, and associating the accounts with respective user entities, wherein the single user entity includes one of the multiple user entities.

In a first embodiment, mapping a given extracted user identifier to a given account includes normalizing the given user entity to a specific format, wherein the given account includes the normalized user entity.

In a second embodiment, the single user entity is associated with one or more accounts.

In a third embodiment, multiple user identifiers map to a given account for the single user entity.

In additional embodiments, detecting the first event includes detecting the first event on a first networked entity, and wherein detecting the second event includes detecting the second event on a second networked entity different from the first networked entity.

In further embodiments, detecting the first even includes detecting multiple first events during a first time period, and the method further includes generating a profile in response to the multiple first events, wherein detecting a second event includes detecting one or more second events in a second time period subsequent to the first time period, and wherein the combination of the first and the second events includes detecting that the one or more second events are not in accordance with the profile.

In supplemental embodiments, the first event includes a time-based status of the single user entity, and wherein the second event is not in accordance with the time-based status.

There is also provided, in accordance with an embodiment of the present invention, an apparatus for protecting a computer network, including a network interface card (NIC), and at least one processor configured to identify multiple user identifiers associated with a single user entity, to detect a first event carried out using a first one of the user identifiers, to detect a second event carried out using a second one of the user identifiers that is different from the first one of the user identifiers, and in response to a combination of the first and the second events, to issue an alert.

There is additionally provided, in accordance with an embodiment of the present invention, a computer software product for protecting a computing system, the product including a non-transitory computer-readable medium, in which program instructions are stored, which instructions, when read by a computer, cause the computer to identify multiple user identifiers associated with a single user entity, to detect a first event carried out using a first one of the user identifiers, to detect a second event carried out using a second one of the user identifiers that is different from the first one of the user identifiers, and in response to a combination of the first and the second events, to issue an alert.

BRIEF DESCRIPTION OF THE DRAWINGS

The disclosure is herein described, by way of example only, with reference to the accompanying drawings, wherein.

DETAILED DESCRIPTION OF EMBODIMENTS

Networked entities that communicate over computer network typically store logs that record events on the networked entities. While these logs can include identifiers for the events, user entities (e.g., employees of an organization) may use multiple accounts (e.g., email accounts) when accessing data on the network, and each account may use multiple identifiers when accessing data on the network. Therefore, it can be difficult to detect suspicious/malicious activity performed by a given user entity using different accounts and different user identifiers on the network.

Embodiments of the present invention provide methods and systems for protecting a computer system by identifying multiple user identifiers associated with a single user entity. Upon detecting a first event carried out using a first one of the user identifiers and detecting a second event carried out using a second one of the user identifiers that is different from the first one of the user identifiers, an alert can be issued in response to a combination of the first and the second events. In some embodiment the first event is collected from a first log on a first networked entity and the second event is collected from a second log on a second networked entity different than the first networked entity.

In one embodiment, multiple events can be collected from multiple event logs on networked entities coupled to a computer network. Identifiers can be extracted from the events, the identifiers can be normalized so as to map the events to accounts, and a subset of the accounts can be associated with the single user entity. A user entity profile can then be generated based on the events associated with the single user entity. Using this embodiment, systems implementing embodiments of the present invention can detect and flag suspicious activity if any subsequent events associated with the single user entity are determined not to be in accordance with the user entity profile.

System Description

Figure 1:
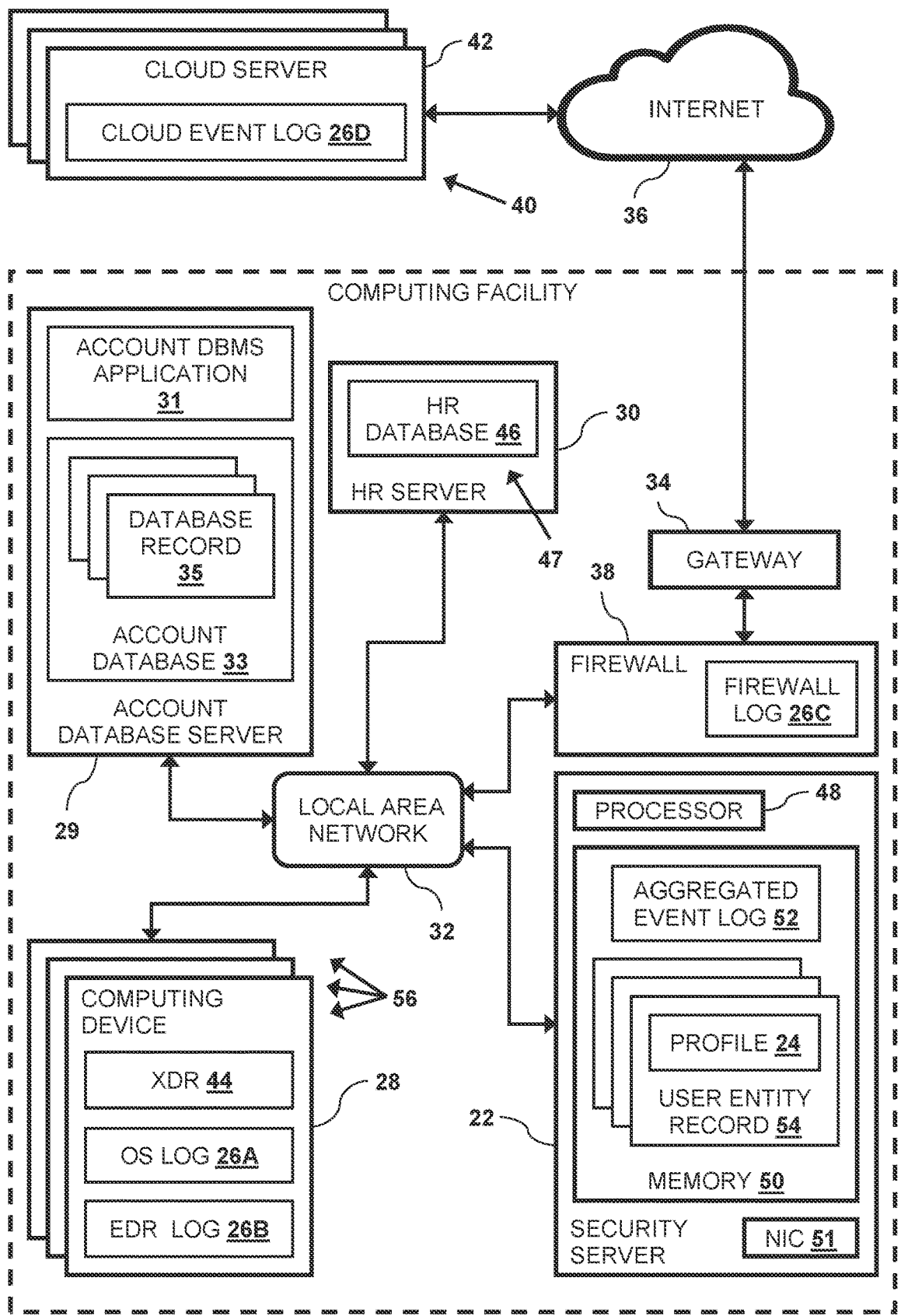
FIG. 1 is a block diagram that schematically shows a computing facility comprising a security server that is configured to generate activity profiles for user entities based on events retrieved from network event logs, in accordance with an embodiment of the present invention.

FIG. 1 is a block diagram that schematically shows an example of a computing facility 20 comprising a security server 22 that is configured to generate user entity activity profiles 24 based on activity recorded by a plurality of networked entities in respective event logs 26, in accordance with an embodiment of the present invention. In the configuration shown in FIG. 1, security server 22 is configured to communicate with a plurality of computing devices 28 (also known as hosts or host computers), an account database server 29 and a human resources (HR) server 30 over a data network such as a local area network (LAN) 32.

Account database server 29 may comprises a domain database management system (DBMS) application 31 and a domain database 37. Account database 33 comprises a set of account database records 35 that are described in the description referencing FIG. 4 hereinbelow.

Computing facility 20 may also comprise an Internet gateway 34, which couples computing facility 20 to a public network 36 such as the Internet. To protect computing devices 28, computing facility 20 may also comprise a firewall 38 that is coupled to LAN 32 and controls, based on predetermined security rules, data traffic between computing devices 28 and a data cloud 40 comprising one or more cloud servers 42.

As described supra, security server 22 can be configured to generate user entity profiles 24 based on activity recorded by a plurality of networked entities in respective event logs 26. While the configuration in FIG. 1 shows the networked entities comprise computing devices 28, firewall 38 and cloud servers 42, any other type of networked entities that communicate over a network are considered to be within the spirit and scope of the present invention.

In the configuration shown in FIG. 1, event logs 26 can be differentiated by appending a letter to the identifying numeral, so that the web pages:

Operating system (OS) logs 26A store information on events generated by operating systems (such as Windows™ produced by Microsoft Corporation, and Linux™) and applications executing on computing devices 28.

Endpoint detection and response (EDR) logs 26B store information on events detected by endpoint agents 44 (e.g., XDR™ produced by Palo Alto Networks, Inc., of 3000 Tannery Way, Santa Clara, CA 95054 USA) executing on computing devices 28.

Firewall log 26C stores information on transmissions between computing facility 20 (e.g., computing devices 28) and servers (e.g., cloud servers 42) coupled to Internet 36. One example of a firewall 38 is the PA-3250 Next Generation Firewall™ produced by Palo Alto Networks, Inc.

Cloud event logs 26D store information on events generated by cloud servers 42. Examples of logs 26 include, but are not limited to application logs, resource logs, and service logs for Amazon Web Services (provided by Amazon.com, Inc., 410 Terry Avenue North Seattle, WA 98109 USA).

In embodiments described herein, security server 22 can be configured to extract user identifiers (IDs) from logs 26, normalize the user IDs and associate the normalized user IDs with user entities (i.e., individual people such as employees). In some embodiments, HR server 30 stores an HR database 46 that stores information for each user entity. In some embodiments, HR database 46 comprises a set of records 47 that have a one-to-one correspondence with user entities (i.e., employees) of an organization.

Security server 22 comprises a processor 48, a memory 50 and a network interface card (NIC) 51 that couples the security server to LAN 32. In some embodiments, processor 48 can combine logs 26 into an aggregated event log 52. Event logs 26 and 52 are described respectively in the descriptions referencing FIGS. 2 and 3 hereinbelow.

While in embodiments described herein, processor 48 collects events from event logs 24A-24D, and stores to aggregated event log 52, aggregating events from other types of event logs 26 into the aggregated event log is considered to be within the spirit and scope of the present invention. Examples of information that can be stored by one or more additional event logs 26 include, but are not limited to:

Input/Output (I/O) events (also known as file events). An example of an I/O event is domain account "Company\jdoe" writing a file named "local_file\malicious.exe". Domain accounts are described hereinbelow.

Registry events. An example of a registry event is domain account "Company\jdoe" modifying a registry key related to Autorun, with the value "local_file\malicious.exe".

Process execution events. An example of a process execution event is SYSTEM automatically executing "local_file\malicious.exe" with permissions of domain account "company\jdoe".

Network events. An example of a network event is domain account "company\jdoe", using a process named local_file\malicious.exe, performed an HTTP request to "www.malware_command_and_control.com".

A

Single sign-on (SSO) events. SSO services (e.g., Okta™, PingOne™, AzureAD™ typically provide audit logs, which. One example of an event that processor 48 can collect is SSO account "john.doe@company.com" logging in.

Email events. Email logs that store email events can be collected from local systems such as Outlook™, server (i.e., corporate) systems such as Exchanger Server™ and cloud-based email servers such as Exchange Online™. An example of an email event in a local system is an email sent/received by "john.doe@gmail.com". An example of an email event in a server system is an email sent/received by "johndoe@company.com". An example of an email event in a cloud-based system is an email sent/received by "john_doe@cloud_email_provider.com".

In the configuration shown in FIG. 1, memory 50 also stores a plurality of user entity records 54 that store profiles 24. In some embodiments, each given user entity record 54 can retrieve information for a given user entity from HR database 46 and store the retrieved information to the given user entity record.

In some embodiments, tasks described herein such as extracting user-IDs from event logs 26, normalizing the user IDs, associate the normalized user IDs with user entities, aggregating logs 26 into aggregated event log 52, and generating user entity profiles 24 may be split among multiple computers systems 22, 28 and 30 within computing facility 20 or external to the computing facility (e.g., cloud servers 42). In additional embodiments, the functionality of some or all of computing devices 28, security server 22, account database server 29 and HR server 30 may be deployed in computing facility 20 and/or Internet 36 as physical computing devices, virtual machines or containers.

In some embodiments, client computers 28 have respective host names 56 that can be used to identify each of the client computers.

Processor 48 comprises a general-purpose central processing units (CPU) or special-purpose embedded processors, which are programmed in software or firmware to carry out the functions described herein. This software may be downloaded to security server 22 in electronic form, over a network, for example. Additionally or alternatively, the software may be stored on tangible, non-transitory computer-readable media, such as optical, magnetic, or electronic memory media. Further additionally or alternatively, at least some of the functions of processor 48 may be carried out by hard-wired or programmable digital logic circuits.

Examples of memory 50 include dynamic random-access memories, non-volatile random-access memories, hard disk drives and solid-state disk drives.

Figure 2:
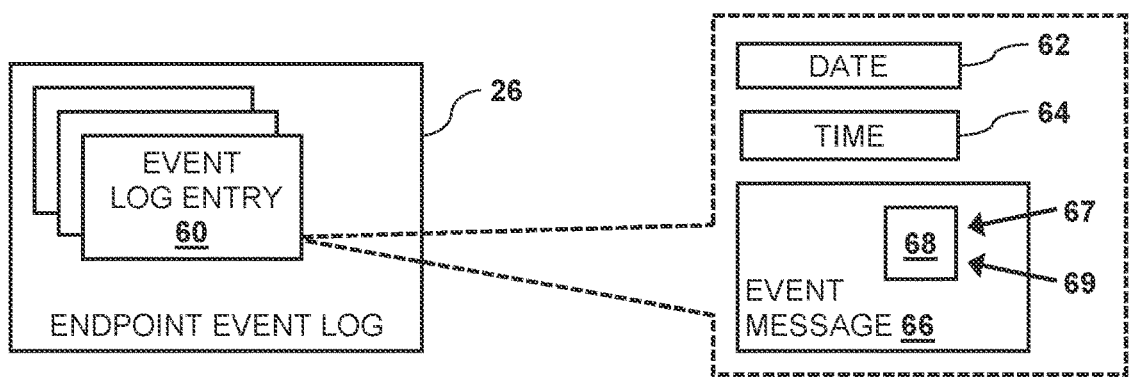
FIG. 2 is a block diagram showing an example of a given event log, in accordance with an embodiment of the present invention.

FIG. 2 is a block diagram shown an example of data components stored in event logs 26, in accordance with an embodiment of the present invention. While event logs 26A-26D may store information in different respective layouts (i.e., formats and schemas), for purposes of simplicity the event logs herein comprise a single layout.

In the example shown in FIG. 2, each event log 26 comprise a set of event log entries 60, each of the event log entries comprising a date 62, a time 64 and an event message 66 that stores a description of an event. For a given event in a given event log entry 60, date 62 comprises the date of the given event, time 64 comprises the time of the given event and event message 66 describes an event and lists user identifiers of participants. User identifiers are described in the description referencing FIG. 3 hereinbelow.

Each event message 66 (i.e., referencing a given event) can have one or more user identifiers 68 (i.e., participants in the corresponding event). In one example, if a given event message corresponds to an event comprising a user entity sending an email, then the given event message 66 comprises a single identifier (ID) 68. In another example, if a given event message corresponds to an event comprising a first account associated with a first user entity granting one or more system permissions to a second account associated with a second user entity, then the given event message may comprise two identifiers 68.

In embodiments of the present invention, there are multiple user entities 67 (i.e., individual physical users) that operate computing devices using one or more respective accounts 69. As described hereinbelow, processor 48 can map each identifier 68 to a respective account 69, and then associate each account 69 with a respective user entity 67. Accounts 69 are described in the description referencing FIG. 5 hereinbelow.

In some embodiments, processor 48 can retrieve event log entries 60 from all the event logs (e.g., event logs 26A-26D), and store event information in the retrieved event log entries to aggregated event log 52. As described hereinbelow, processor 48 can use the information stored in aggregated event log 52 to map events to user entities.

Figure 3:
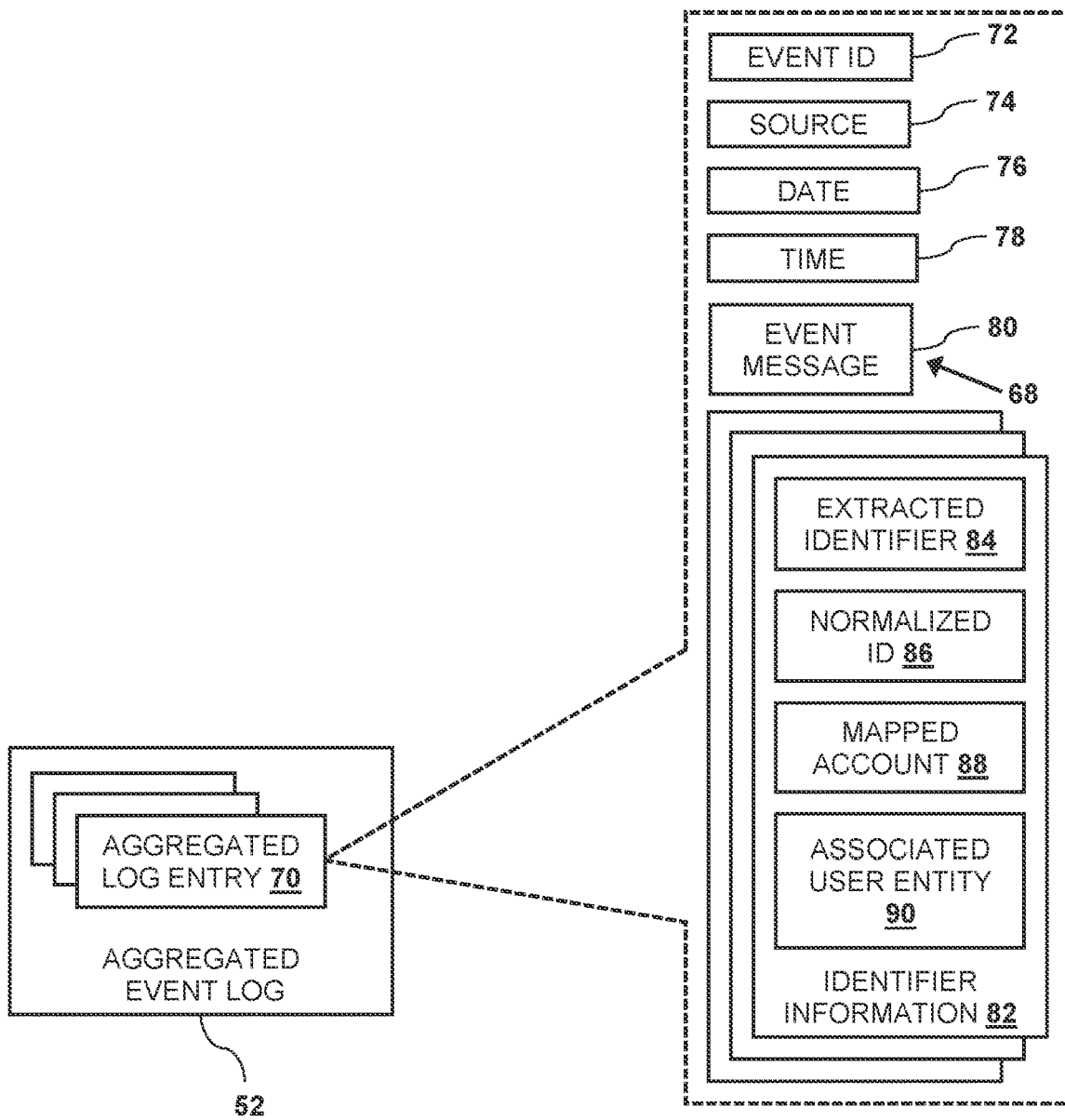
FIG. 3 is a block diagram showing an example of an aggregated event log stored on the security server, in accordance with an embodiment of the present invention.

FIG. 3 is a block diagram shown an example of data components stored in aggregated event log 52, in accordance with an embodiment of the present invention. Aggregated event log 52 comprises a set of aggregated log entries 70. In some embodiments, processor 48 can create a new aggregated log entry 70 for each event log entry 60 in each event log 26. In other words, each aggregated log entry 70 has a corresponding event log entry 60.

Each aggregated event log entry 70 comprises an event ID 72, a source 74, a date 76, a time 78, an event message 80 and an identifier information record 82. Upon creating a new aggregated log entry 70 for a corresponding event log entry 60, processor 48 can:

Create a unique event ID 72.

Store, to source 74, an identifier of the device that generated the event log storing the corresponding event log entry 60. Examples of identifiers include, but are not limited to, Internet Protocol (IP) address of a given cloud server 42 or a media access control (MAC) address of a given computing device 28.

Copy date 62 in the corresponding event log entry 60 to date 76.

Copy time 64 in the corresponding event log entry 60 to time 78.

Copy event message 66 in the corresponding event log entry 60 to event message 80.

In some embodiments, processor 48 can extract one or more user IDs 69 from event message 80$s$, normalize the user IDs and associate the normalized user IDs with user entities. In the configuration shown in FIG. 3, each user ID 69 extracted from a given event message 80 has a corresponding identifier record 82 that stores information such as an extracted user identifier 84, an identifier type 86, a mapped account m and an associated user entity 90.

Upon creating the new aggregated log entry (i.e., as described supra), processor 48 can identify a number (i.e., one or more) identifiers 68 in event message 80, add the identified number of identifier information records 82 to the new aggregated log entry so that each identifier 68 has a corresponding identifier information record 82, and populate each given identifier information record as follows:

Store the corresponding identifier 68 to extracted identifier 84.

Classify extracted identifier 84, and store the classification to identifier type 86. Identifier classifications are described hereinbelow.

Normalize the corresponding identifier 68 so as to map the corresponding identifier to a given account 69, and store the mapped account to mapped account 88. Normalizing identifiers 68 is described in the description referencing FIG. 6 hereinbelow.

Identify a given user entity 67 associated with mapped account 88, and store the identified user entity to associated user entity 90. Identifying associated user entities 90 is described in the description referencing FIG. 6 hereinbelow.

In examples described hereinbelow, a given user entity 67 named "John Doe" works for a company "Company", has multiple mapped accounts 88, each referenced by one or more identifiers 84.

Examples of identifier types 86 include, but are not limited to:

Domain names such as "Company/jdoe". Domain names can typically be found in event messages 66 in event logs 26A, 26B and 26C.

Fully qualified domain names (FQDN) such as "Company.com/jdoe". FQDNs can typically be found in event messages 66 in event logs 26A, 26B and 26C.

A username (i.e., without a domain) such as "jdoe". Usernames can typically be found in event messages 66 in event logs 26A, 26B and 26C.

A Security Identifier (SID) number such as "S-1-5-21-1602811402-2595058921-120187713-502". SID numbers can typically be found in event messages 66 in event logs 26A and 26B.

A Globally Unique Identifier (GUID) number such as "8c6bfd4a-4cb2-11ea-b67e-88e9fe502c1f". GUID numbers can typically be found in event messages 66 in event logs 26B and 26D.

A local username such as "host123\doe", where "host123" comprises a given host name 56. Local usernames can typically be found in event messages 66 in event logs 26A, 26B and 26C.

A corporate username such as "john.doe@company.com". These usernames can typically be found in event messages 66 in event logs 26 such as SSO logs (not shown), email logs (not shown), and event logs 26C and 26D.

A personal username such as "john.doe@gmail.com". These usernames can typically be found in event messages 66 in event logs 26 such as SSO logs (not shown), email logs (not shown), and event logs 26C and 26D.

Figure 4:
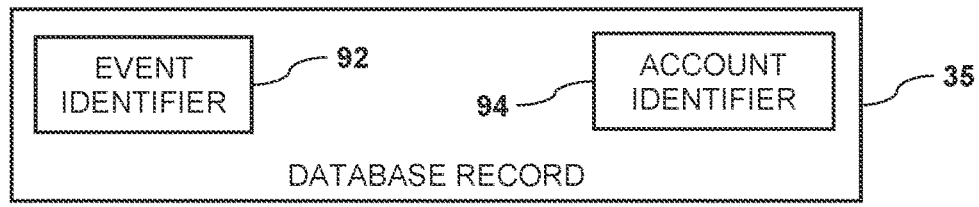
FIG. 4 is a block diagram showing an example of a database record that can be stored by a domain database server, in accordance with an embodiment of the present invention.

FIG. 4 is a block diagram showing an example configuration of a given database record 35, in accordance with an embodiment of the present invention. Each database record 35 can store information such as an event identifier 92 and a corresponding account identifier 94 that references a given account 69. Using this configuration, account database records 33 can store known relationships between identifiers 68 and accounts 67.

In some embodiments, account database 33 may comprise Directory Sync Service™ (DSS™), produced by Palo Alto Networks, Inc., and endpoint agents 44 may comprise XDR™, the XDR™ endpoint agent may interact with DSS™ to retrieve mappings between identifiers 68 and accounts 67.

For example, relationships between identifiers 68 and accounts 67 can be maintained by a directory services application (not shown) such as is Active Directory™ (produced by Microsoft Corporation, Redmond, Washington, USA) that performs operations such as authenticating and authorizing all users and computers in a Windows™ domain type network, assigning and enforcing security policies for all computers, and installing or updating software. In this example, account DBMS 31 can query Active Directory™ to retrieve mappings between identifiers 68 and accounts 67 that comprise domain accounts.

Figure 5:
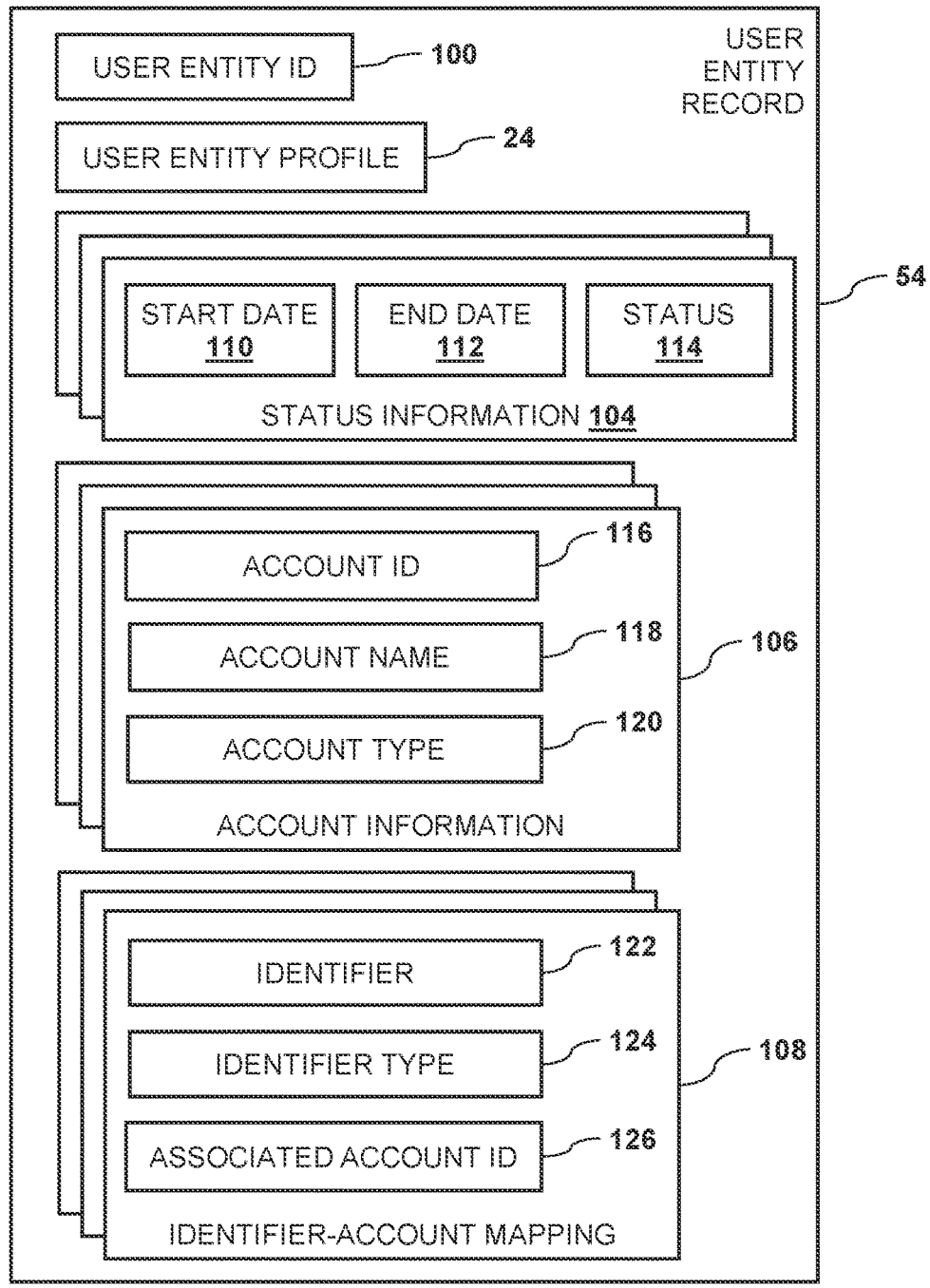
FIG. 5 is a block diagram showing an example of user entity information stored on the security server, in accordance with an embodiment of the present invention.

FIG. 5 is a block diagram showing an example of information stored in user entity records 54, in accordance with an embodiment of the present invention. In the configuration shown in FIG. 5, each user identity record 54 stores information such as a user entity ID 100, user entity profile 24, a set of status information records 104, a set of account information records 106 and a set of identifier-account mapping records 108.

User entity ID 100 comprise a unique identifier for a given user entity 67. In some embodiments, processor can create a set of user entity records 54 that have a one-to one correspondence with account database records 47, and store a unique identifier to each user entity id 100 in the set. Therefore, each given user entity (i.e., employee) 67 has a corresponding user entity record 54. User entity IDs 100 may also be referred to herein as user entities 100.

User entity profile 24 comprises a user profile indicating expected activity of the corresponding user entity. As described in the description referencing FIG. 7 herein below, processor 48 can use user profile 24 to detect any anomalies in actions performed by the corresponding user entity in computing facility 20.

Each status information records comprises a start date 110, and end date 112 and a status 114. Each given status 114 spans a time period starting with start date 110 and ending with end date 112. In some embodiments, start date 110 and end date 112 may also include time (e.g., 13:30 on 12/11/22).

Examples of statuses 114 include, but are not limited to:

Employment period. Processor 48 can flag activity (e.g., emails, file access) by the corresponding user entity as suspicious if the user entity is no longer employed by the organization.

Vacation period. Processor 48 can flag activity (e.g., emails, file access) by the corresponding user entity as suspicious if the user entity is on vacation.

Location. Organizations may have multiple locations, and HR database can keep track of the location where each user entity works at a given time. In some embodiments, processor 48 can use this information to detect activity by a given user entity working from an anomalous location.

Device. User entities 100 may use different computing devices 28 (e.g., desktop/laptop computers and mobile devices). Processor 48 can use this information to track which of the user entities are using which computing devices 28 at any given time (i.e., past or present)

Department. At any given time, each user entity 100 can be assigned to a specific department (e.g., finance, marketing), thereby indicating systems (e.g., payroll, ad tracking) that are typically accessed by employees in each department.

Title. An organization title of a given user entity 100 (e.g., manager, supervisor) can indicate privileges and typical system behavior for the given user entity.

Each user entity ID 100 typically uses one or more email accounts. In the configuration shown in FIG. 5, each given user entity 100 comprises a corresponding user entity record 54 that stores a corresponding account information record 106 for each of the email accounts used by the given user entity.

Each account information record 106 can store information such as a unique account ID 116, an account name 118 (i.e., an email address such as "john.doe@company.com"

and john.doe@gmail.com) and account type 120. In embodiments herein, account ID 116 may also be referred to as account 116.

Examples of account types 120 include, but are not limited to:
- Domain accounts such as "Company/jdoe". A domain account comprises an account that can be used across Acvive Directory™ (produced by Microsoft Corporation) domain in an organization. Domain accounts are typically associated with the following identifier types 86: domain names, FQDNs, usernames, SID numbers, GUID numbers and corporate identifiers.
- Local accounts comprising accounts such as "host123/jdoe" (i.e., where "host123" comprises a given host name 56) that are bound to specific respective networked entities. Local accounts are typically associated with the following identifier types 86: usernames, SID numbers, GUID numbers and local users.
- Cloud accounts such as "john.doe@company.com". A cloud account can be used across cloud infrastructure, like Google Cloud Platform™ (provided by Alphabet Inc., Mountain View, California) or Azure™ (provided by Microsoft Corporation). Cloud accounts are typically associated with the following identifier types 86: GUID numbers, corporate identifiers and personal identifiers.
- Personal accounts comprising accounts such as "john.doe@gmail.com" that can be used both inside and outside an organization. Personal accounts are typically associated with the personal identifiers.

In embodiments of the present invention, processor 48 extracts identifiers 84 from event log entries 60 and normalizes the extracted identifiers so as to identify respective mapped accounts 88. For a given user entity 100 in the corresponding user entity record 54, processor 48 can store, in identifier-account mapping records 108, current mappings between the extracted identifiers and the associated accounts (i.e., both for the given user entity). Each identifier-account mapping record 108 in a given user entity record 54 (i.e., for a corresponding user entity 100) can store information such as:
- A user identifier 122 comprising a given identifier 84 used by the corresponding user entity.
- An identifier type 124. As described supra, identifier types 124 comprise domain names, FQDNs, usernames, SID numbers, GUID numbers, local usernames, corporate identifiers and personal identifiers.
- An associated account ID 126 that stores a given account ID 116 that processor 48 associates with identifier 122.

User Entity Identification

Figure 6:
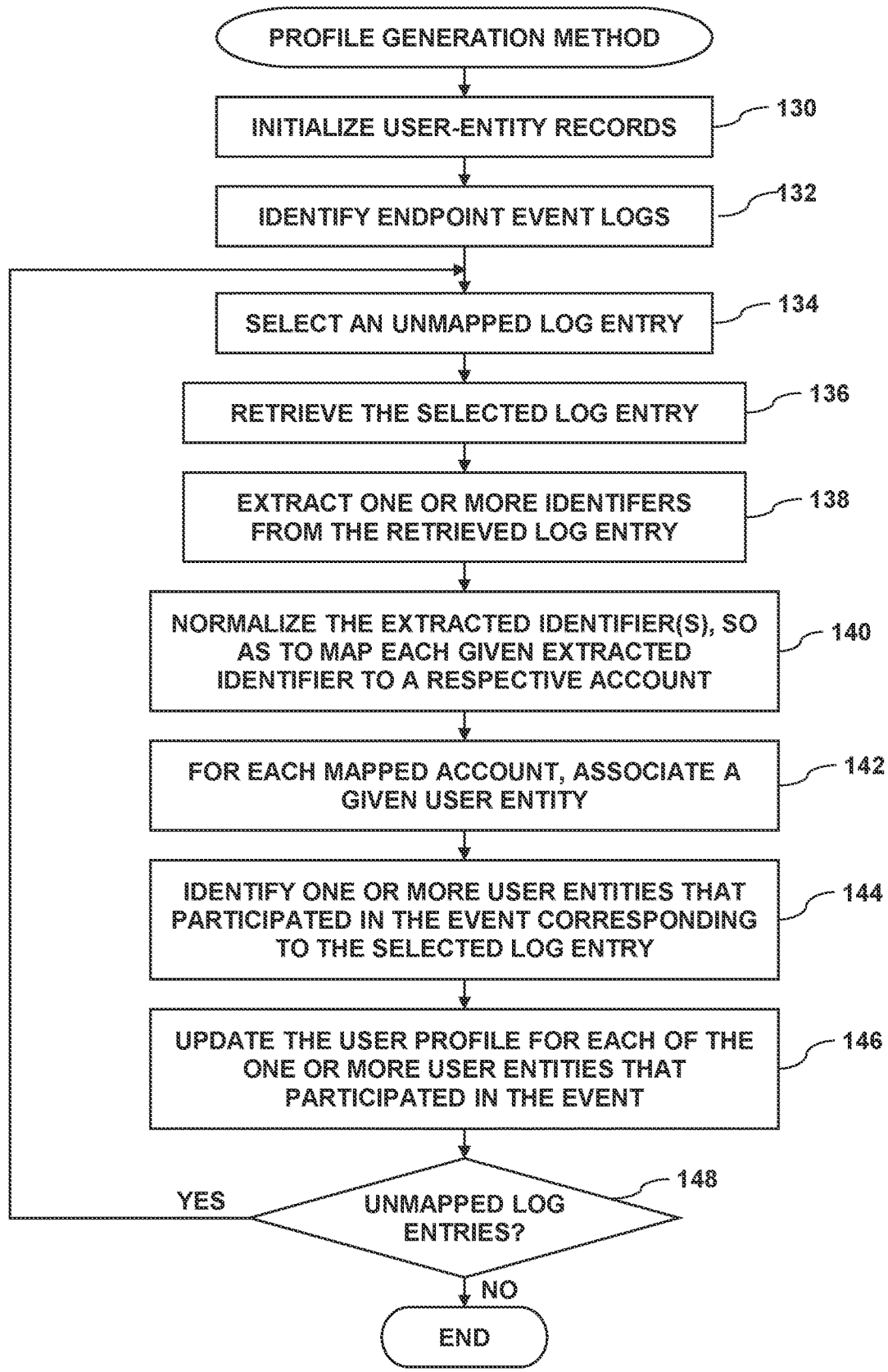
FIG. 6 is a flow diagram that schematically illustrates a method of generating the activity profiles, in accordance with an embodiment of the present invention.

FIG. 6 is a flow diagram that schematically illustrates a method of associating activity in event logs 26 with user entities 100 and generating profiles 24 based on activity of the user entities in computing facility 20, in accordance with an embodiment of the present invention.

In step 130, processor 48 initializes user entity records 54. In some embodiments as described supra, each user entity record 54 corresponds to a given HR database record 47 an a corresponding user entity 100. When initializing user entity records 54, Additionally, when initializing user entity records 54, processor 48 can initialize user entity profiles 24 as well.

In step 132, processor 48 identifies event logs 26.

In step 134 the processor selects an unmapped event log entry 60 in a given event log 26. In embodiments herein, unmapped event log entries 60 comprise any of the event log entries no processed by steps 134-136 as described hereinbelow.

In step 136, processor 48 retrieves the selected event log entry. Upon retrieving the selected log entry, processor 48 can add a new aggregated log entry 70 to aggregated event log 52, and populate, in the new aggregated log entry, event ID 72, source 74, date 76, time 78 and event message 80 using embodiments described hereinabove.

In step 138, processor 48 identifies one or more identifiers 68 in event message 80 and stores the identified identifiers 68 to one or more extracted identifiers 84 (i.e., in one or more respective identifier information records 82).

In step 140 processor 48 normalizes the one or more extracted identifiers 84 to one or more specified formats so as to map each of the extracted identifiers to a respective account 116. In some embodiments, each account type 120 may have a corresponding specified format. Using the examples of account types described supra:
- A specified format for the account type "domain account" can be "CompanyName[/]UserName", where "CompanyName" and "UserName" are self-descriptive. As described supra, an example of a domain account is "Company/jdoe".
- A specified format for the account type "local account" can be "ComputerID/UserName", where "ComputerID" comprises an identifier for a given computing device 28 on network 32 and "UserName" is self-descriptive. As described supra, an example of a local account is "host123/jdoe".
- A specified format for the account type "cloud account" can be "UserName[@]CompanyDomain", where "UserName" is self-descriptive comprises an identifier for a given computing device 28 on network 32 and "UserName" is self-descriptive and "CompanyDomain" comprises a corporate domain name. As described supra, an example of a cloud account is "john.doe@company.com".
- A specified format for the account type "personal account" can be "UserName[@]ProviderDomain", where "UserName" is self-descriptive comprises and "ProviderDomain" comprises an email service provider domain name (e.g., Gmail™, provided by Alphabet Inc.). As described supra, an example of a personal account is "john.doe@gmail.com".

In some embodiments, the format for a given event is based on the source (e.g., the event log that processor 48 retrieved the event log entry corresponding to the given event, the event type, the field in the log entry corresponding to the given event) or content of the log entry corresponding to the given event. For example:
- If a given extracted identifier 84 has an email identifier format (i.e., "local-part [@]domain", where "local-part" comprises a username and "domain") then processor 48 can normalize the given identifier to a cloud account (e.g., "john.doe@company.com") or a personal account (e.g., "john.doe@gmail.com").
- If processor 48 extracts a given identifier 84 from a given log entry 60 from a log of a email server, and the domain is some public service, we will know it is most likely referring to a private email account (e.g., the context was that the given log entry came from a given log 26 of an email serve, and the content of the given log entry comprised a public email domain like "@gmail").
- SID formats can refer to local or domain accounts and are usually differentiated by content. In some embodiments, the prefix of the SID will uniquely identify the domain, or the local machine (e.g., a given computing device 28).

GUIDs can refer to different account types, and can recognized by context (e.g., the respective types of logs 26 from which processor 48 extracted the GUIDs) or by matching the GUIDs to "ground truths" that processor 48 can extract from account database 33 (e.g., DSS™).

In some embodiments, there may be mappings from one or more extracted identifiers 84 (corresponding to respective identifiers 68) to a single account 116 (corresponding to a given account 69). For example:

Processor 48 can map the following identifiers 84 to a given account 116 "Company/jdoe" whose account type 120 comprises a domain account:
"Company/jdoe" whose identifier type 86 comprises a domain name.
"Company.com/jdoe" whose identifier type 86 comprises a FQDN.
"jdoe" whose identifier type 86 comprises a username without any domain.
"S-1-5-21-1602811402-2595058921-120187713-502" whose identifier type 86 comprises a SID.
"8c6bfd4a-4cb2-11ea-b67e-88e9fe502c1f" whose identifier type 86 comprises a GUID.
"host123\jdoe" whose identifier type 86 comprises a local username.
"john.doe@company.com" whose identifier type 86 comprises a corporate username.

Processor 48 can map the following identifiers 84 to a given account 116 "host123/jdoe" whose account type 120 comprises a local account:
"jdoe" whose identifier type 86 comprises a username without any domain.
"S-1-5-21-1602811402-2595058921-120187713-502" whose identifier type 86 comprises a SID.
"8c6bfd4a-4cb2-11ea-b67e-88e9fe502c1f" whose identifier type 86 comprises a GUID.
"host123\jdoe" whose identifier type 86 comprises a local username.

Processor 48 can map the following identifiers 84 to a given account 116 "john.doe@company.com" whose account type 120 comprises a cloud account:
"8c6bfd4a-4cb2-11ea-b67e-88e9fe502c1f" whose identifier type 86 comprises a GUID.
"john.doe@company.com" whose identifier type 86 comprises a corporate username.
"john.doe@gmail.com" whose identifier type 86 comprises a personal username.

Processor 48 can map the following identifier 84 to a given account 116 "john.doe@gmail.com" whose account type 120 comprises a personal account:
"john.doe@gmail.com" whose identifier type 86 comprises a personal username.

In some embodiments, processor 46 can query database records 35 to the extracted identifiers to a respective account 116.

Upon performing each mapping of a given extracted identifier 84, processor 48 stores, the mapped account (ID) 116 to mapped account 88 in the identifier information record 82 storing the given extracted identifier. If any given mapping detected is step 140 is not already stored to user entity records 54, processor 48 can add a new identifier-account mapping record in the user entity record storing the mapped account, and populate identifier 122, identifier type 124 and associated account ID 126 accordingly.

In a first normalization embodiment, can normalize a given extracted identifier 84 by string manipulation (i.e., processor 48 stores the extracted identifiers as text strings). In this embodiment, processor 48 can normalizing extracted identifiers 84 to enable correlations and queries. For example, processor 48 can use string manipulation to normalize both
"jdoe@company[.]onmicrosoft[.]com"
"domain=company.local, username=jdoe" to "company\jdoe".

In a second normalization embodiment, processor 48 can normalize a given extracted identifier 84 by using domain knowledge. In this embodiment, special identifiers can indicate the type and scope of the account (e.g., at the host or main levels) mapped to the given identifier. In the following examples, processor 48 can use domain knowledge to:
Map "AzureAD\jdoe" to a cloud account.
Map "MicrosoftAccount\jdoe" domain to a personal Microsoft™ account.
Map "company\jdoe$" to a machine account of a given host name 56 "jdoe". In this example "$" in the identifier indicates a machine account (i.e., "$"+a username).

Domain knowledge enables processor 48 to differentiate between accounts that are typically managed differently in Active Domain™ and Kerberos realms, as well as various data cloud environments.

In a third normalization embodiment, processor 48 can normalize a given extracted identifier 84 by using prior learned knowledge. In this embodiment, processor 48 can use learned roles and Directory Synchronization Service (DSS™) to determine the account for a given extracted identifier 84. In the following examples, processor 48 can use domain knowledge as follows:
If ad_domain_role contains "company" then account type 120 is a domain account.
If internal_hostname_role contains "company" then account type 120 is a local account
If the event message only has a SID number, then processor 48 can pivot via the DSS.sid field ("sid" is an abbreviation for "security identifier" in Active Directory™) so as to map the given extracted identifier to "company\jdoe".
If the given extracted identifier comprises "john.doe@gmail[.]com", pivot via the DSS.upn field ("upn" is an abbreviation for "user principal name" in Active Directory™) so as to recognize the given extracted identifier as a domain account, and then map the extracted identifier to normalized identifier "company\jdoe". In this example, processor 48 compares the string "john.doe@gmail[.]com" to the DSS.upn field, and if a record with that value is found, it will be considered to be a domain account, and the processor will return normalized identifier "company\jdoe". In some embodiments, the value in the corresponding DSS record "DSS.netbios_domain\DSS.sam_account_name" may comprise "company\jdoe".

Returning to the flow diagram, in step 142, for each given mapped account 88, processor 48 associates a given user entity 100 with a given mapped account 88. In some embodiments, each user entity 100 may be associated with one or more accounts 116. For example, as described supra, the mapped accounts may comprise "Company/jdoe", "host123/jdoe", "john.doe@company.com" and "john.doe@gmail.com". All these mapped accounts 88 may be associated with a given user entity named "John Doe".

In a first association embodiment, processor 46 can use information stored in HR database 46 and/or account database 33 so as to associate a given account 69 with a given user entity 67. For example, if processor 46 uses account database 33 to map a given identifier 68 to a given account 69 "john.doe@gmail.com", and identifies a given user entity 67 named "John Doe" in HR database 46, then the processor can associate the given account with the given user entity as they have the same name.

In a second association embodiment, processor 48 can use heuristics to associate the given user entity with the given mapped account. For example, if "john.doe@gmail[.]com" matches DSS display name "John Doe" then they likely refer to the same user entity 100.

In a third association embodiment, processor 48 can use profiling and attribution to associate the given user entity with the given mapped account. In one profiling example, processor 48 can determine that the computing device having the host name "host123" is mostly used by a single user entity 100 "company\jdoe". In a second profiling example, processor 48 can determine that the account "john.doe@gmail[.]com" always originates log entries 60 from the computing device having the host name "host_123".

In a first attribution example, processor 48 can determine that the computing device having the host name "host_123" is a personal endpoint used by the user entity "jdoe". In a second attribution example, processor 48 can determine that "john.doe@gmail[.]com" is the personal email of the user entity "jdoe". In a third attribution example, processor 48 can determine that the user entity "jdoe" likely has access to the account "host_123\Administrator".

Returning to the flow diagram, in step 144, processor 48 identifies one or more of the user entities that participated in the event corresponding to the selected log entry.

In step 146, processor 48 updates, with the event indicated by the event message in the selected log entry, the user entity profile for each of the user entities identified in step 144. In some embodiments, processor 48 can update user entity profiles 24 with the event indicated in the selected log entry only if the event was within a specified time period (e.g., the last 30 days).

In step 148, if there are any unmapped log entries 60, then the method continues with step 132. The method ends when there are no unmapped log entries 60.

Once processor 48 creates profiles 24, the processor can use the profiles to detect a single user entity 100 using multiple identifiers 122 to perform malicious activity in computing facility 20. For example, Processor 48 can:

1. Detect a cloud account "jdoe@company[.]com" downloaded a file "confidential.pdf" from Google Drive™ (provided by Alphabet Inc., Mountain View, California).
2. Detect that domain account "Company\jdoe" renamed file "confidential.pdf" to "obscure.zip".
3. Detect an email sent to personal email "john.doe@gmail[.]com" with an attachment named obscure.zip While each of these individual events may seem legitimate, embodiments of the present invention enable correlating these three events to a single user entity 100 "John Doe". Correlating multiple events having multiple identifiers 122 enables processor 48 to detect a suspicious sequence of events that are tied to a single user entity 100.

Figure 7:
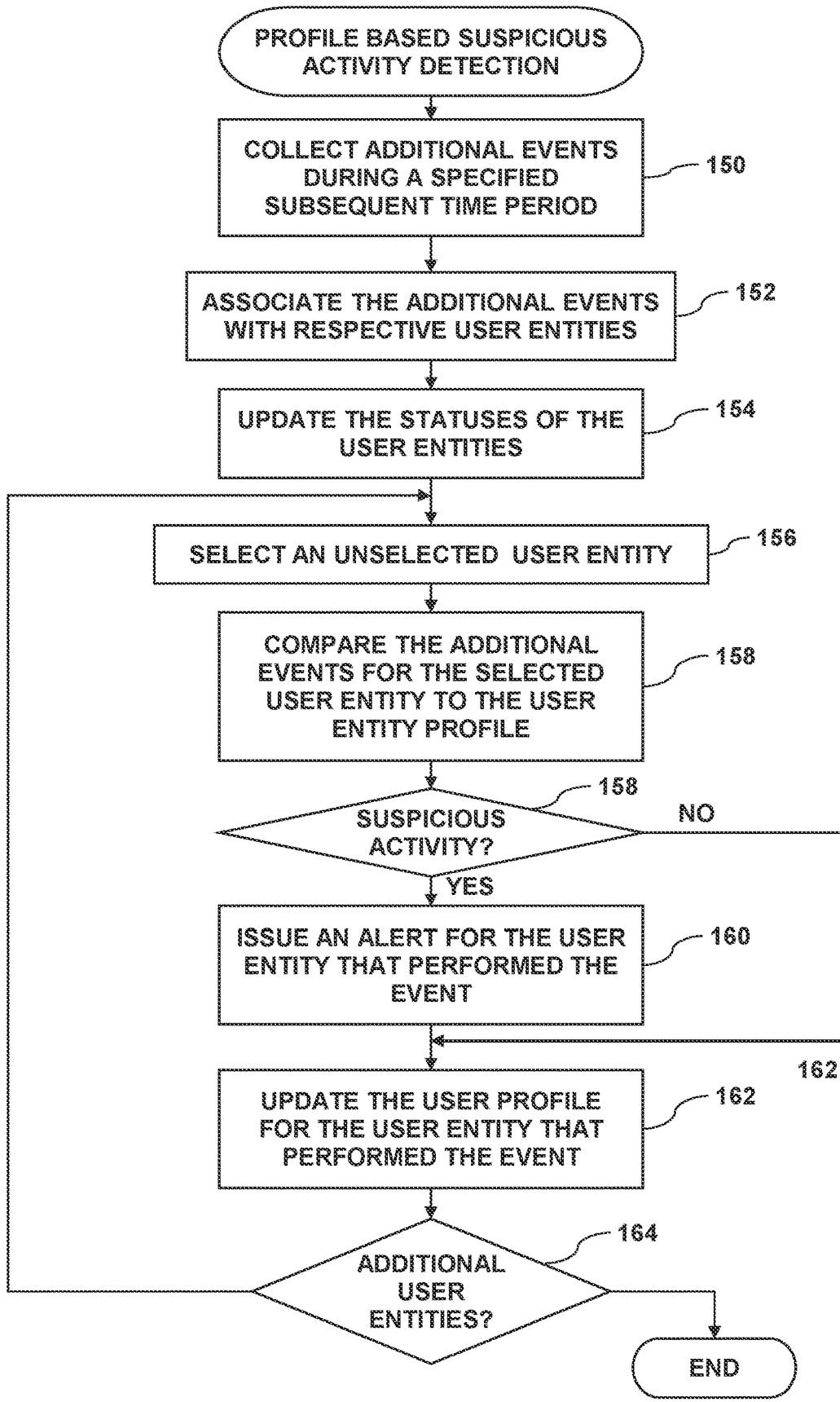
FIG. 7 is a flow diagram that schematically illustrates a method of using the generated activity profiles to detect suspicious activity, in accordance with an embodiment of the present invention.

FIG. 7 is a flow diagram that schematically illustrates a method of using user entity activity profiles 24 to detect suspicious activity, in accordance with an embodiment of the present invention.

In step 150, at a time subsequent to generating profiles 24 as described in the description referencing FIG. 6 hereinabove, processor 48 collects, from logs 26, a set of additional event log entries 60. In some embodiments, processor 48 can collect the additional event log entries during a specific time period (e.g., 10 minutes or a full day).

In step 152, processor 48 associates each of the events in the event messages in the additional event log entries with respective user entities 100, using embodiments described in the description referencing steps 140-142 in FIG. 6 hereinabove.

In step 154, processor 48 updates status information records 104 with any updates to HR database 46 and updates user entity profiles 24 accordingly. For example, the user entity "John Doe" may be on vacation.

In step 154 processor 48 selects an unselected user entity 100.

In step 156, processor 48 compares the additional events for the selected user entity to user entity profile 24 of the selected user entity.

In step 158, processor 48 determines, based on the user entity profile, whether or not the additional events comprise suspicious activity. In some embodiments each user profile 24 can include information from status records 104 for the corresponding user entity 100. For example, if a given status for 114 for a given user entity 100 indicates that the given user entity is retired, and processor 48 detects events associated with the user entity subsequent to the retirement, then the processor can classify those events as suspicious since the events are not in accordance with the retirement status in the user entity profile.

If the additional events comprise suspicious activity, then in step 160, processor 48 issues an alert for the selected user entity. In one embodiment, the suspicious activity may combine a first event in a first given event log entry 60 that processor 48 used to generate the user entity profile, and a second event in a second given event log entry 60 that processor 48 collected in step 150. In this embodiment, the first and the second given event log entries mapped to different identifiers 122 associated with the same user entity 100.

To issue the alert processor 48 can perform operations such as transmitting a message to a system administrator (not shown) or restricting access to any of the accounts associated with the selected user entity.

In step 160, processor 48 updates the user entity profile of the selected user entity with the additional events associated with the selected user entity.

In step 164, if there are any unselected user entities 100 (i.e., in step 156), then the method continues with step 156. If there are no unselected user entities 100, then the method ends.

Returning to step 158, if processor 48 did not detect, based on the user entity profile, any suspicious activity in the additional events, then the method continues with step 162.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for protecting a computer system, comprising:
- identifying, by a processor, multiple user identifiers associated with a single user entity;
- detecting a status of the user entity, based on an information record of a first one of the user identifiers, wherein the status has a timespan;
- detecting an event carried out during the timespan using a second one of the user identifiers that is not in accordance with the status of the user entity based on the information record of the first one of the user identifiers; and
- issuing an alert in response to detecting the event carried out during the timespan.

2. The method according to claim 1, wherein identifying the multiple user identifiers associated with the single user entity comprises collecting a set of events, extracting respective user identifiers from the events in the set, mapping the extracted user identifiers to respective accounts, and associating the accounts with respective user entities, wherein the single user entity comprises one of the multiple user entities.

3. The method according to claim 2, wherein mapping a given extracted user identifier to a given account comprises normalizing the given user entity to a specific format, wherein the given account comprises the normalized user entity.

4. The method according to claim 2, wherein the single user entity is associated with one or more accounts.

5. The method according to claim 2, wherein multiple user identifiers map to a given account for the single user entity.

6. The method according to claim 1, wherein detecting the status comprises detecting a first event indicative of the status on a first networked entity, and wherein detecting the event comprises detecting a second event on a second networked entity different from the first networked entity.

7. The method according to claim 1, wherein detecting the status comprises detecting multiple first events during a first time period, and generating a profile in response to the multiple first events, wherein detecting the event comprises detecting one or more second events in a second time period subsequent to the first time period.

8. The method according to claim 1, wherein detecting the status comprises detecting, based on the first one of the user identifiers, that during the timespan the user entity was no longer employed by an organization issuing the first one of the user identifiers.

9. The method according to claim 1, wherein detecting the status comprises detecting, based on the first one of the user identifiers, that during the timespan the user entity was on leave from an organization issuing the first one of the user identifiers.

10. The method according to claim 1, wherein detecting the status comprises detecting, based on the first one of the user identifiers, a first location of the user entity during the timespan, and wherein detecting the event comprises detecting an action carried out during the timespan at a second location, different from the first location, using the second one of the user identifiers.

11. The method according to claim 1, wherein detecting the status comprises detecting, based on the first one of the user identifiers, a first device used by the user entity during the timespan, and wherein detecting the event comprises detecting an action carried out on a second device, different from the first device, during the timespan using the second one of the user identifiers.

12. The method according to claim 1, wherein detecting the status comprises detecting, based on the first one of the user identifiers, a department in an organization to which the user entity belongs during the timespan, and wherein detecting the event comprises detecting a system accessed during the timespan using the second one of the user identifiers, wherein the system is not typically accessed by members of the department to which the user entity belongs.

13. The method according to claim 1, wherein detecting the status comprises detecting, based on the first one of the user identifiers, a level of privileges of the user entity during the timespan, and wherein detecting the event comprises detecting an action carried out using the second one of the user identifiers during the timespan that is not compatible with the level of privileges.

14. An apparatus for protecting a computer network, comprising:
- a network interface card (NIC); and
- at least one processor configured:
  - to identify multiple user identifiers associated with a single user entity,
  - to detect a status of the user entity, based on an information record of a first one of the user identifiers, wherein the status has a timespan,
  - to detect an event carried out during the timespan using a second one of the user identifiers that is not in accordance with the status of the user entity based on the information record of the first one of the user identifiers, and
  - to issue an alert in response to detecting the event carried out during the timespan.

15. The apparatus according to claim 14, wherein a given processor is configured to identify the multiple user identifiers associated with the single user entity by collecting a set of events, extracting respective user identifiers from the events in the set, mapping the extracted user identifiers to respective accounts, and associating the accounts with respective user entities, wherein the single user entity comprises one of the multiple user entities.

16. The apparatus according to claim 15, wherein a given processor is configured to map a given extracted user identifier to a given account by normalizing the given user entity to a specific format, wherein the given account comprises the normalized user entity.

17. The apparatus according to claim 15, wherein the single user entity is associated with one or more accounts.

18. The apparatus according to claim 17, wherein multiple user identifiers map to a given account for the single user entity.

19. The apparatus according to claim 14, wherein a given processor is configured to detect the status by detecting a first event indicative of the status on a first networked entity of a network, and to detect the event by detecting a second event on a second networked entity different from the first networked entity.

20. The apparatus according to claim 14, wherein a given processor is configured to detect the status by detecting multiple first events during a first time period, and wherein the given processor is further configured to generate a profile in response to the multiple first events, and wherein the given processor is configured to detect the event by detecting one or more second events in a second time period subsequent to the first time period.

21. A computer software product for protecting a computing system, the product comprising a non-transitory computer-readable medium, in which program instructions are stored, which instructions, when read by a computer, cause the computer:
- to identify multiple user identifiers associated with a single user entity;
- to detect a status of the user entity, based on an information record of a first one of the user identifiers, wherein the status has a timespan;
- to detect an event carried out during the timespan using a second one of the user identifiers that is not in accordance with the status of the user entity based on the information record of the first one of the user identifiers; and
- to issue an alert in response to detecting the event carried out during the timespan.

* * * * *